United States Patent Office 3,435,311
Patented Mar. 25, 1969

3,435,311
OSCILLATORY ELECTROMECHANICAL
CONVERTER
Masanao Matsuzawa, Suwa-shi, Issei Imahashi, Nagano-ken, and Koichi Nakamura, Suwa-shi, Japan, assignors to Kabushiki Kaisha Suwa Seikosha, Tokyo, Japan, a corporation of Japan
Filed Dec. 22, 1965, Ser. No. 515,547
Claims priority, application Japan, Feb. 8, 1965, 40/6,739
Int. Cl. H02k 47/08; G04c 3/00
U.S. Cl. 318—129                    8 Claims

ABSTRACT OF THE DISCLOSURE

An oscillating electromechanical converter comprising an electromagnet having two pairs of poles at its extremities to thereby provide air gaps between each pair of poles. The electromagnet is pulsed alternately with pulses of positive and negative polarity causing oscillatory movement of a permanent magnet armature.

---

This invention relates to an electromechanical converter and more particularly to an electric timepiece converter for converting electric signals into rotative motion.

Electric timepieces such as wrist watches or pocket watches are driven by an enclosed power source which typically comprise a miniaturized battery. Because of the small dimensions which are characteristic of such timepieces it is essential that the efficiency of conversion of electrical energy, supplied by the battery, to the rotative mechanical force which is applied to the escape wheel be maintained at a high level. The electromechanical converters presently used have an inherently low conversion efficiency because of the arrangement of its magnetic circuit so that the pulsating magnetic fluxes pass through the permanent magnet causing deterioration in the permanent magnet. The hitherto used electromechanical converters also have a low conversion efficiency because the attraction force developed between the permanent magnet pole and the pole induced on the yoke interferes with the force which acts to reverse the alternative position of the permanent magnet.

An object of the present invention is the provision of an electromechanical converter of simplified construction, for use in electric battery powered timepieces.

A further object of the present invention is the provision of an electromechanical converter having a high electromechanical conversion efficiency for use in electric timepieces such as wrist and pocket watches.

Still another object of the present invention is the provision of an electromechanical converter which is operative to convert electric impulses applied thereto to rotative motion at a high level of electromechanical conversion efficiency.

In accordance with the principles of the present invention there is provided an electromechanical converter comprising an electromagnet having two pairs of magnetic poles at its extremities to thereby provide air gaps between each pair of poles. An intermittent drive mechanism is disposed in proximate relationship with the electromagnet and is operative to convert the pulsating magnetic force produced by the electromagnet to rotative motion of an escape wheel. The intermittent drive mechanism comprises a reciprocating oscillative member with a permanent bar magnet fixedly secured thereto with the pole tips thereof being acted upon by the pulsating magnetic field produced by the electromagnet. The permanent magnet is thus acted upon by pulsating magnetic forces which tend to alternately attract and repulse its pole tips thus causing the oscillative member to accordingly oscillate about its axis to drive the escape wheel.

The novel features believed to be characteristic of this invention are set forth with particularity in the appended claims. The invention itself, however, both as to its organization and advantages thereof, may best be understood by reference to the following description taken in connection with the accompanying drawings wherein:

Figure 1:
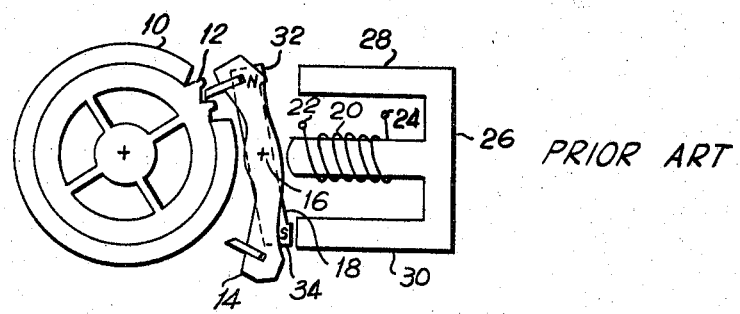
FIG. 1 shows a mechanical converter for timepieces of the type that is presently employed.

FIG. 1 shows a typical conventional electromechanical converter suitable for driving a gear train in timepieces. An escape wheel 10 having teeth 12 is driven by a pallet fork 14 which oscillates about its axis 16. Mounted on pallet fork 14 and fixedly secured thereto is a permanent magnet 18. A driving coil 20, having input terminals 22 and 24 for the application of driving pulses thereto, is wound on the center leg of an iron core 26 having a pair of yokes 28 and 30. Upon the application of driving pulses of alternative polarity to input terminals 22 and 24 there is created a time variant magnetic field in the air gap between the extremities of yokes 28 and 30. Since permanent magnet 18 lies in the pulsating magnetic field thus created it is acted upon by pulsating forces tending to alternately attract and repulse the north pole end 32 from yoke 28 and the south pole end 34 from yoke 30 respectively, accordingly, permanent magnet 18 oscillates about its axis 16 and pallet fork 14 which is attached thereto drives escape wheel 10.

In FIGS. 2 and 4–7 identical numerals are employed for similar components to facilitate a clear understanding of the principles and practice of the invention in its preferred embodiments.

Figure 2:
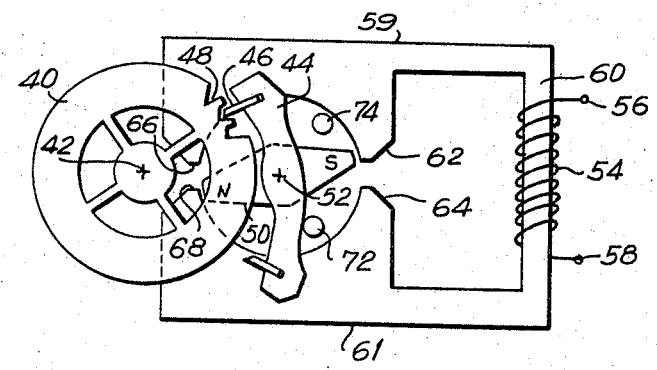
FIG. 2 shows an electromechanical converter in accordance with one embodiment of the present invention.

FIG. 2 illustrates an embodiment of the present invention showing an escape wheel 40 operative to oscillate about its axis 42. Escape wheel 40 is driven by a pallet fork 44 having a pawl 46 secured thereto which is operative to engage teeth 48 of escape wheel 40 to thereby apply an intermittent driving force to wheel 40. The above mentioned driving force is derived by the interaction of a permanent magnet 50 which is secured to pallet fork 44 at point 52 and a pulsating magnetic field in which it is disposed as hereinafter described. A driving coil 54 having input terminals 56 and 58 for the application of driving pulses thereto, is wound on a core 60 which has two yokes 59 and 61 extending therefrom having legs 62, 64, 66 and 68. Upon the application of driving pulses of alternate polarity to winding input terminals 56 and 58 there is created, in the air gaps defined by legs 62, 64, 66 and 68, a pulsating magnetic field which acts upon permanent magnet 50 located therein. Thus, when the north pole N of permanent magnet 50 faces leg 68, south pole S faces leg 62; and when north pole N faces leg 66 south pole S faces leg 64 in accordance with the polarity of the driving pulses applied to winding 54.

Figure 3:
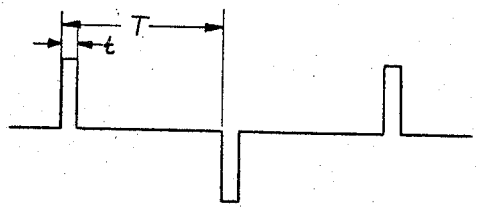
FIG. 3 is a wave form diagram showing the electric pulses applied to the electromechanical converter of FIG. 2.
Figure 6:
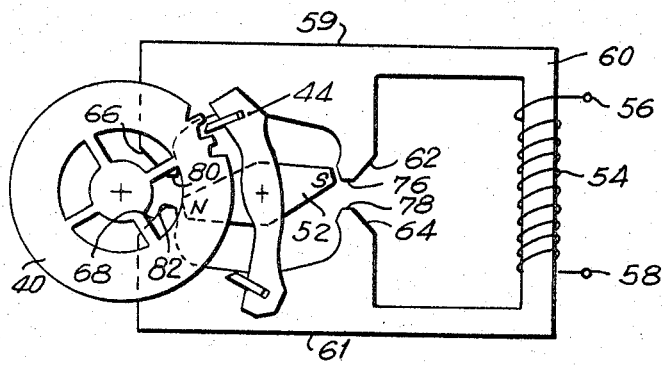
FIG. 6 shows another embodiment of the present invention wherein the banking pins of the embodiment of FIG. 2 are not required.
Figure 7:
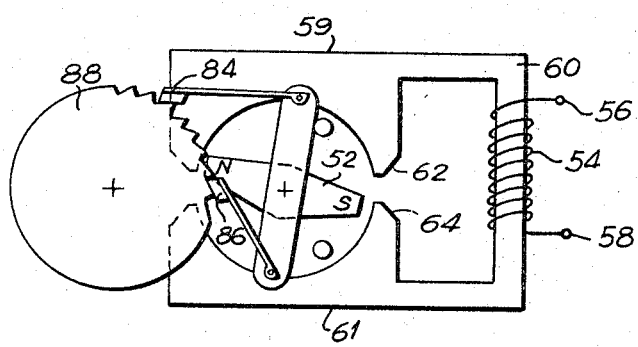
FIG. 7 shows yet another embodiment of the present invention utilizing an intermittent drive mechanism which is different from that of FIG. 2.

The underlying feature of the present invention which contributes to the high conversion efficiency hitherto unattainable can best be understood by comparing the presently employed converter as shown in FIG. 2 with that of the embodiment of the present invention as shown in FIG. 3. In FIG. 2 assume that the polarity of the pulse applied to winding 20 is such that yokes 59 and 61 become south and north poles respectively. It is seen that the magnetic force which attracts the south pole tip of permanent magnet 18 to yoke 30 is opposed by the corresponding magnetic force which attracts the north pole tip of the magnet 18 to yoke 28. Thus, during the period of inversion torque produced by the interaction of one of the yokes of core 26 with one of the pole tips of magnet 18 is opposed by a torque produced by the interaction of the other yoke with the corresponding pole tip of magnet 18. Accordingly, a greater inversion torque is required to overcome the opposition torque and the electromechanical conversion efficiency is correspondingly reduced. On the other hand, in the various embodiments of the present invention as depicted by FIGS. 2, 6 and 7 driving inversion the magnetic forces produced by the interaction of the poles tips of magnet 50 with legs 62, 64, 66 and 68 are all additive to produce a unilateral inversion torque. As a result the electromechanical conversion efficiency, in the embodiment of the present invention, is substantially higher than that obtainable by the prior art converters as exemplified by the converter of FIG. 1.

In FIG. 3 is a wave form diagram showing the driving pulses which are applied across terminals 56 and 58 of winding 54, wherein T is the period between successive pulses and t is the duration of the applied pulses. It is seen that the input power required for driving escape wheel 40 may be reduced by reducing the ratio of the pulse duration t to the period T. Since the period T is determined by the required frequency of oscillation of wheel 40, the input power consumption can be reduced by reducing, within suitable limits, the pulse duration t.

Figure 4:
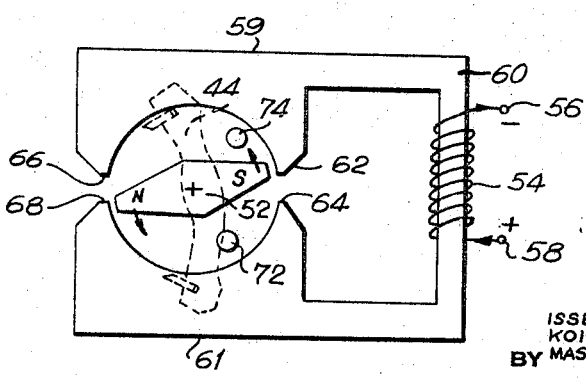
FIGS. 4 and 5 illustrate the movement of the intermittent drive mechanism of the embodiment of FIG. 2.
Figure 5:
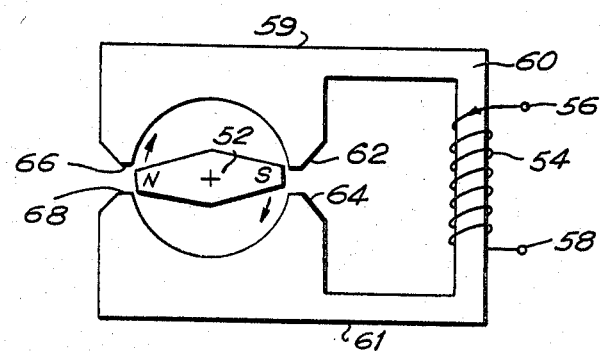

FIGS 4 and 5 illustrate the movement of permanent magnet 50 and pallet fork 44 upon the application driving pulses to input terminals 56 and 58 of winding 54. FIG. 4 indicates the position and direction of rotation of permanent magnet 50 upon the application of a pulse at the polarity indicated to make terminal 58 positive and terminal 56 negative. Thus, permanent magnet 50 is positioned in a magnetically stable position as shown with its south pole S facing leg 62 and its north pole N facing leg 68.

FIG. 5 indicates the movement of permanent magnet 50 when a subsequent pulse is having a polarity opposite to that of the pulse previously applied; is applied to winding 54. In this instance terminal 56 is positive with respect to terminal 58 and there is created a magnetic flux path between the extremities of legs 66 and 68 and between 62 and 64, which produces a force tending to rotate permanent magnet 50 in the direction shown. When the current in coil 54 is reversed, upon the application of a subsequent driving pulse of opposite polarity, the direction of the magnetic fields between legs 66 and 68 and between 62 and 64 respectively, reverses to rotate permanent magnet 50 in the direction shown in FIG. 4. A pair of banking pins 72 and 74 are provided, as shown to limit the extreme positions of pallet fork 44 and to minimize any external disturbances such as vibration.

In comparing the conventional electro-mechanical converter of FIG. 1 with the embodiment of the present invention as shown by FIGS. 2, 4 and 5, it is seen that, in the present invention, since the substantial portion of the magnetic flux produced by the driving pulses does not pass through permanent magnet 50, deterioration of magnet 50 due to the continuous application of a magnetic stress thereto is thereby avoided.

Typical design values for an electromechanical converter constructed in accordance with the principles of the present invention for a pocket size timepiece are as follows:

Period of driving pulses=1 second,
Inversion time of permanent magnet 50=10 milliseconds,
Magnitude of driving pulse=1.3 volts,
Number of turns on driving coil 54=8000 turns,
Equivalent moment of inertia of permanent magnet 50= 1500 milligram-millimeter$^2$
Equivalent load torque of permanent magnet 50=30 dyene-centimeters,
Power consumption=60 microwatts.

FIG. 6 shows another embodiment of the present invention wherein the banking pins such as pins 72 and 74 of FIG. 2, are eliminated with the extreme positions of pallet fork being determined magnetically by virtue of the interaction of permanent magnet 50 with legs 62, 64, 66 and 68. In this embodiment, the width of the extremities of permanent magnet 50 is substantially equal to the width of the extremities 76, 78, 80 and 82 of legs 62, 64, 66 and 68 respectively. Consequently, in the configuration shown by FIG. 6, power losses due to friction and adhesion due to direct contact of pallet fork 44 with banking pins is eliminated, thus contributing to a high efficiency of conversion of electrical energy to rotational motion.

The principles of the present invention are not confined to the intermittent drive mechanism of FIGS. 2–6 but may suitably include others such as magnetic escapement mechanisms or those employing pawls and a ratchet wheel as shown in FIG. 7. Thus, in FIG. 7 pawls 84 and 86 operative together with ratchet wheel 88 at teeth 90 to convert the reciprocating motion of magnet 50 to rotative motion of wheel 80, the principles and methods of operation of the device shown in FIG. 7 otherwise being similar to that shown in FIGS. 2–6.

While the above described method constitutes a particular embodiment of the invention, it will be understood that it is not wished to be limited thereto since modifications can be made both in the circuit arrangement and the instrumentalities employed and it is contemplated in the appended claims to cover any such modifications as fall within the true spirit and scope of the invention.

What is claimed and desired to be secured by U.S. Letters Patent is:

1. An electromechanical converter operative to convert electrical energy to rotative motion comprising an electromagnet having two pairs of magnetic poles at its extremities and having corresponding air gaps between each of said pairs of poles; an intermittent drive mechanism comprising an escape wheel and a oscillative member operative to cause said escape wheel to rotate; a permanent magnet mounted on said oscillative member; aplication means in electromagnetic relationship with said electromagnet and operative to apply thereto electric pulses of alternating polarity; said oscillative member operative in response to the time variant magnetic fields produced across said air gaps by said electromagnet to drive said escape wheel.

2. An electromechanical converter operative to convert electrical energy to rotative motion comprising an electromagnet having two pairs of magnetic poles at its extremities and having corresponding air gaps between each of said pairs of poles; an intermittent drive mechanism comprising an escape wheel and an oscillative member operative to cause said escape wheel to rotate; a permanent magnet fixedly mounted on said oscillative member; and means in circuit with said electromagnet and operative to apply thereto electric pulses of alternating polarity; said pulses producing a time variant magnetic field alternately in each of said air gaps; said permanent magnet interacting with said magnetic field to cause said oscillative member to oscillate in accordance with and in response to said applied pulses thereby driving said escape wheel.

3. An electromechanical converter as defined in claim 2 wherein said electromagnet is U-shaped and comprises a core and a pair of yokes extending from said core; each of said yokes having a pair of legs with each of said leg pairs inwardly disposed to face each other across the pair of air gaps existing therebetween; the legs of one of said yokes being of one polarity and the legs of the other of said yokes being of opposite polarity.

4. An electromechanical converter as defined in claim 3 wherein said magnetic fields are alternately produced across each of said pair of air gaps, said permanent magnet responsive thereto to align itself in accordance with the instantaneous direction of said magnetic field thereby causing said oscillative member to oscillate in accordance with the frequency of the electric pulses applied to said electromagnet.

5. An electromechanical converter as defined in claim 4 wherein said electric pulse application means comprises a coil wound about the core portion of said electromagnet.

6. An electromechanical converter as defined in claim 4 wherein there is produced across said air gaps pulsating magnetic forces operative at a frequency equal to said applied electric pulses to invert the position of said permanent magnet.

7. An electromechanical converter as defined in claim 6 wherein said pairs of legs are suitably poled so that said inversion forces developed across said air gaps are additive.

8. An electromechanical converter as defined in claim 7 wherein the rest position of said permanent magnet is determined solely by the magnetic field produced by said electromagnet.

References Cited

UNITED STATES PATENTS

| | | | |
|---|---|---|---|
| 2,771,572 | 11/1956 | Adams | 310—36 XR |
| 2,946,940 | 7/1960 | Beyner et al. | 310—38 XR |
| 2,960,643 | 11/1960 | Boyd | 310—38 XR |
| 2,999,966 | 9/1961 | Beyner et al. | 310—38 XR |
| 3,221,231 | 11/1965 | Reich | 318—129 |
| 3,343,012 | 9/1967 | Scott | 310—36 |
| 2,730,634 | 1/1956 | De Saint-Vaulry | 310—39 |
| 2,920,439 | 1/1960 | Rich | 58—28 |
| 2,954,642 | 10/1960 | Jackson | 58—28 X |
| 3,141,290 | 7/1964 | Gerhard | 58—28 |

FOREIGN PATENTS 862,586  3/1961  Great Britain.

MILTON O. HIRSHFIELD, *Primary Examiner.*

D. F. DUGGAN, *Assistant Examiner.*

U.S. Cl. X.R.
310—37; 58—23, 28